US009483262B2

(12) United States Patent
Sasaki et al.

(10) Patent No.: US 9,483,262 B2
(45) Date of Patent: Nov. 1, 2016

(54) APPARATUS AND METHOD FOR IDENTIFYING CORRESPONDENCE BETWEEN AN INSTALLED PROGRAM AND AN INTERFACE IN A SOURCE CODE

(71) Applicant: FUJITSU LIMITED, Kawasaki-shi, Kanagawa (JP)

(72) Inventors: Hiroshi Sasaki, Yokohama (JP); Nobuo Shiba, Yokohama (JP); Shinya Suematsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/607,551

(22) Filed: Jan. 28, 2015

(65) Prior Publication Data

US 2015/0268954 A1 Sep. 24, 2015

(30) Foreign Application Priority Data

Mar. 20, 2014 (JP) ................................ 2014-059063

(51) Int. Cl.
*G06F 9/44* (2006.01)
*G06F 9/445* (2006.01)

(52) U.S. Cl.
CPC . *G06F 8/73* (2013.01); *G06F 8/61* (2013.01); *G06F 8/75* (2013.01)

(58) Field of Classification Search
CPC .............. G06F 8/73; G06F 8/75; G06F 8/71; G06F 8/61
USPC ........................................................ 717/123
See application file for complete search history.

(56) References Cited

U.S. PATENT DOCUMENTS

2004/0153830 A1* 8/2004 Cebula ................ G06F 11/3688 714/38.14
2007/0198970 A1 8/2007 Horii et al.
2008/0201696 A1* 8/2008 Atkin .................. G06F 17/2872 717/137
2010/0220348 A1* 9/2010 Matsushima ........... H04L 67/02 358/1.13
2012/0233593 A1* 9/2012 Sahoo ..................... G06F 9/465 717/120
2015/0205628 A1* 7/2015 Millar .................. G06F 9/4843 718/1

FOREIGN PATENT DOCUMENTS

JP 2007-172269 7/2007
JP 2009-251769 10/2009

OTHER PUBLICATIONS

JAR (file format), https://en.wikipedia.org/wiki/JAR_(file_format), last modified on Apr. 14, 2016.*

* cited by examiner

*Primary Examiner* — Anna Deng
(74) *Attorney, Agent, or Firm* — Staas & Halsey LLP

(57) ABSTRACT

An apparatus specifies, for each of interfaces described in a source code, an installed program associated with the each interface, based on a description of the source code including a relevant source code corresponding to the installed program, and stores an identifier of the specified installed program in the memory in association with an interface associated with the installed program. The apparatus specifies an interface to be executed upon execution of a program based on the source code, according to contents defined in the source code. The apparatus, upon execution of the program based on the source code, outputs information on the installed program whose identifier is stored in the memory in association with the specified interface, so that the installed program is identifiable.

6 Claims, 13 Drawing Sheets

| INTERFACE (126a) | INSTALLATION (DEFAULT) (126b) | | | INSTALLATION (126c) | | | INSTALLATION (126d) | | | … |
|---|---|---|---|---|---|---|---|---|---|---|
| | DEFINITION NAME | PACKAGE NAME | CLASS NAME | DEFINITION NAME | PACKAGE NAME | CLASS NAME | DEFINITION NAME | PACKAGE NAME | CLASS NAME | … |
| INTERFACE B | ⋮ | ⋮ | ⋮ | ⋮ | ⋮ | ⋮ | ⋮ | ⋮ | ⋮ | … |
| INTERFACE C | def1 | p1 | C SERVICE | def1 another | p2 | Cα SERVICE | ⋮ | ⋮ | ⋮ | … |
| INTERFACE D | def2 | p5 | D SERVICE | def2 another | p6 | Dα SERVICE | def2 beta | p7 | Dβ SERVICE | … |
| ⋮ | ⋮ | ⋮ | ⋮ | ⋮ | ⋮ | ⋮ | ⋮ | ⋮ | ⋮ | … |

FIG.9

```
CASE
DEPENDENCY RELATIONSHIP
  CLASS A DEPENDS ON CLASS X1
  CLASS B DEPENDS ON CLASS X2
  CLASS C DEPENDS ON CLASS Y1
X1,X2 ARE CLASSES OF PACKAGE pkg X
CLASSES OF Y PACKAGE Y

RELATIONSHIP DEFINITIONS
<bean id="A" class = "AImpl">
  <property name="X"><ref local="X1"/></property>
</bean>
<bean id="B" class = "BImpl">
  <property name="X"><ref local="X2"/></property>      } 20
</bean>
<bean id="C" class = "CImpl">
  <property name="Y"><ref local="Y1"/></property>
</bean>
<bean id="X1" class = "pkgX.X1_impl />
<bean id="X2" class = "pkgX.X2_impl />
<bean id="Y1" class = "pkgY.Y1_impl />

SEARCH DEFINITIONS
<context:annotation-config /><context : component-scan base-package="pkgX" />  } 21
<context:annotation-config /><context : component-scan base-package="pkgY" />
```

APPARATUS AND METHOD FOR IDENTIFYING CORRESPONDENCE BETWEEN AN INSTALLED PROGRAM AND AN INTERFACE IN A SOURCE CODE

CROSS-REFERENCE TO RELATED APPLICATION

This application is based upon and claims the benefit of priority from the prior Japanese Patent Application No. 2014-059063 filed on Mar. 20, 2014, the entire contents of which are incorporated herein by reference.

FIELD

The embodiments discussed herein are related to apparatus and method for identifying correspondence between an installed program and an interface in a source code.

BACKGROUND

A technique is known in which a dependency relationship between classes is defined by an interface which is an abstractive method in a source code of a program and a processing is performed based on the program by making, upon execution of the program, correspondence between the interface and a specific installed program. This technique is called DI (Dependency Injection) container. In the DI container, the correspondence between the interface and the installed program is achieved by, for example, a scheme of creating a separate definition file or a scheme of additionally adding an annotation, which is data used for making correspondence between the interface and the program to be installed, to the source code.

A related technique is disclosed in, for example, Japanese Laid-Open Patent Publication No. 2009-251769.

SUMMARY

According to an aspect of the invention, an apparatus specifies, for each of interfaces described in a source code, an installed program associated with the each interface, based on a description of the source code including a relevant source code corresponding to the installed program, and stores an identifier of the specified installed program in the memory in association with an interface associated with the installed program. The apparatus specifies an interface to be executed upon execution of a program based on the source code, according to contents defined in the source code. The apparatus, upon execution of the program based on the source code, outputs information on the installed program whose identifier is stored in the memory in association with the specified interface, so that the installed program is identifiable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 3 is an explanatory diagram illustrating an example of a relationship table storage unit, according to an embodiment;

FIG. 9 is an explanatory diagram illustrating an example of updating of a definition file, according to an embodiment;

DESCRIPTION OF EMBODIMENTS

A correspondence between the interface and the installed program is required to be achieved by an annotation from the viewpoint of a program development, but a definition file may be used for making the correspondence between the interface and the installed program in the program that has been already developed. Therefore, for example, it is required to change the correspondence between the interface and the installed program achieved by a definition file to a scheme of making correspondence between the interface and the installed program by an annotation.

Further, there may exist a situation where a plurality of installed programs may be applied with respect to a single interface. In this case, only a single installed program is allowed to be corresponded to a single interface in the scheme of making correspondence between the interface and the installed program by the annotation. Further, even when the annotation is additionally written into the plurality of installed programs, it is unable to determine which installed program should be utilized in an execution environment of the DI container.

An aspect of the present disclosure is to provide an information processing program, an information processing method, and an information processing apparatus capable of making correspondence between an interface described in a source code and an installed program.

Hereinafter, descriptions will be made on embodiments of an information processing program, an information processing method and an information processing apparatus of the present disclosure based on the accompanying drawings in detail. Further, the present disclosure is not limited to the embodiments. The following embodiments may be appropriately combined with one another without departing from the range of consistency between the embodiments.

Embodiment

Figure 1:
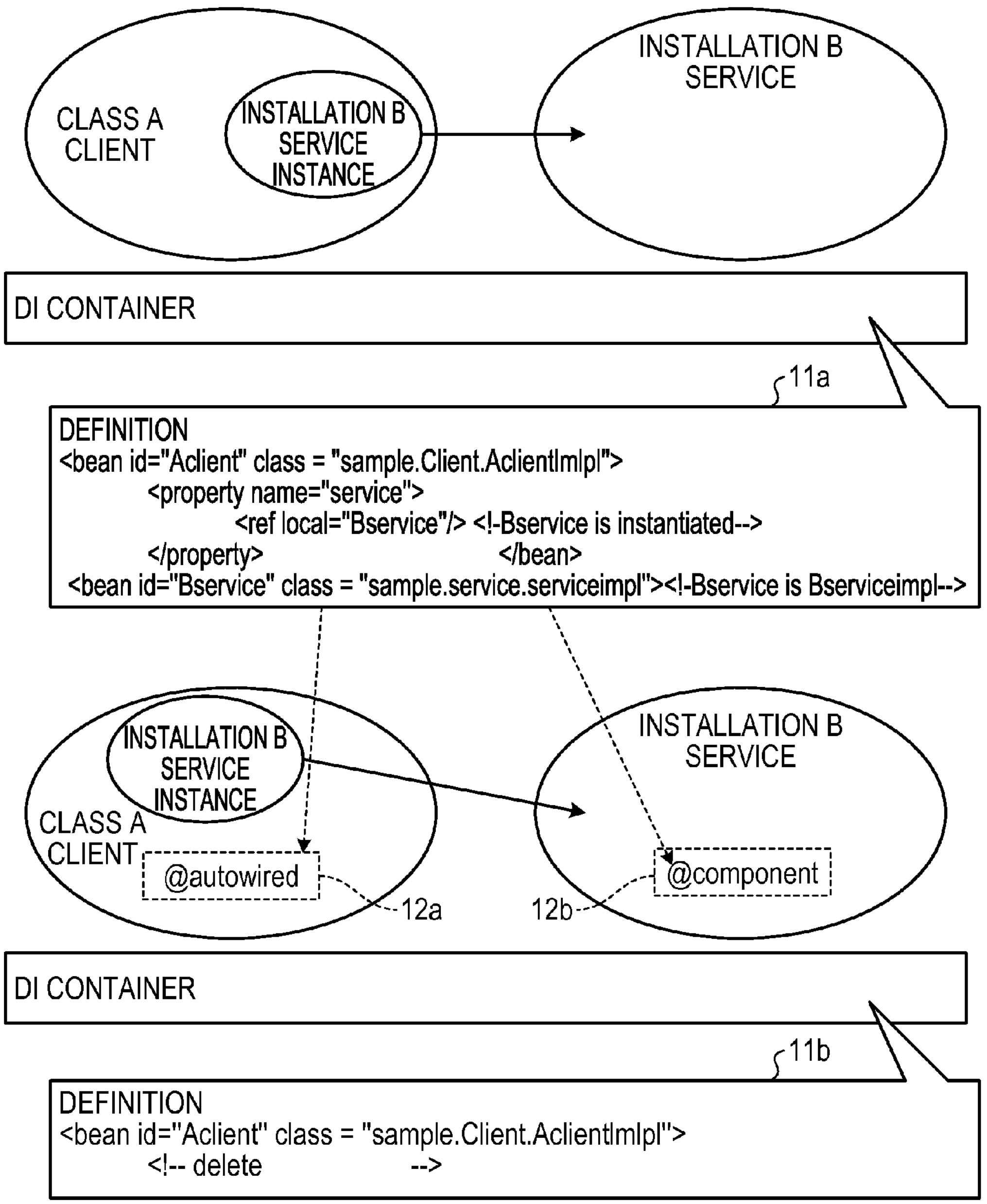
FIG. 1 is an explanatory view illustrating an example of shifting from a scheme of making correspondence by a definition file to a scheme of making correspondence by an annotation, according to an embodiment.

First of all, descriptions will be made on shifting a correspondence between the interface and the installed program achieved by the definition file to a scheme of making correspondence between the interface and the installed program by an annotation. FIG. 1 is an explanatory view illustrating an example of shifting from a scheme of making correspondence by a definition file to a scheme of making correspondence by an annotation. As illustrated in FIG. 1, for example, when a class A client uses an installation B service, an identification ID corresponding to the installation B service which is instantiated regarding the class A client is described in a definition file 11*a* before shifting to the scheme of making correspondence by the annotation.

In order to shift the scheme of making correspondence by the definition file 11*a* to that of making correspondence by the annotation, for example, an annotation 12*a* of "@autowired" is inserted into the source code of the class A client. Further, an annotation 12*b* of "@component" is inserted into the source code of the installation B service. Further, in the definition file 11*b*, descriptions on dependencies of the class are deleted. The shifting from the scheme of making correspondence by the definition file to the scheme of making correspondence by the annotation is basically performed through a flow as described above. Further, the A client and the B service are represented by "Aclient" and "Bservice" in the definition file 11*a*, respectively, and the A client is represented by "Aclient" in the definition file 11*b*. Further, both the class A client and the installation B service are classes, but in the following description, one of the classes which depends on the other may also be simply represented by a class, and one of them on which the other depends may also be simply represented by an installation or an installed program.

Figure 2:
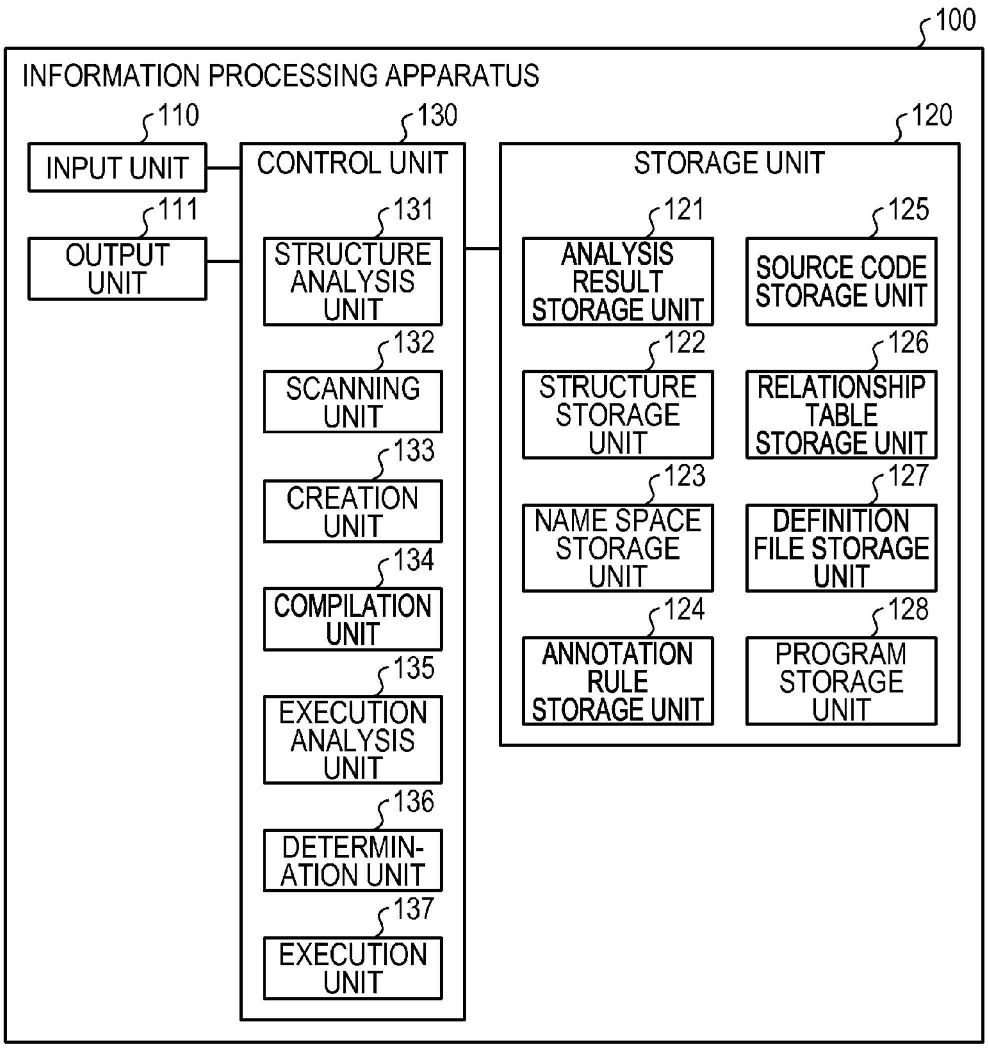
FIG. 2 is a block diagram illustrating an example of a configuration of an information processing apparatus, according to an embodiment.

FIG. 2 is a block diagram illustrating an example of a configuration of an information processing apparatus according to an embodiment of the present disclosure. An information processing apparatus 100 illustrated in FIG. 2 includes an input unit 110, an output unit 111, a storage unit 120, and a control unit 130.

A source code to which shifting to the scheme of making correspondence by the annotation is applied and a definition file corresponding to the source code are input to the input unit 110 from, for example, an external storage device. The input unit 110 outputs the input source code and definition file to the control unit 130.

When an execution result data of a program based on the source code is input from the control unit 130, the output unit 111 outputs the input execution result to a display device such as, for example, a liquid crystal display (LCD) which is not illustrated. A processing result may be displayed within a window as an execution result by installing the window within, for example, a screen.

The storage unit 120 is implemented by a storage device, such as a semiconductor memory device including a RAM (Random Access Memory) or a flash memory, a hard disk, and an optical disk. The storage unit 120 includes an analysis result storage unit 121, a structure storage unit 122, a name space storage unit 123, and an annotation rule storage unit 124. Further, the storage unit 120 includes a source code storage unit 125, a relationship table storage unit 126, a definition file storage unit 127, and a program storage unit 128. Further, the storage unit 120 stores information used for the processing performed in the control unit 130.

The analysis result storage unit 121 stores analysis results of the source code and definitions described in the definition file. The analysis result storage unit 121 stores analysis results of tree structure as the analysis results of the source code and the definitions described in the definition file.

The structure storage unit 122 stores matching and mismatching of structure between the tree structure of the analysis result of the source code and the tree structure of the analysis result of the definitions described in the definition file as a result of comparison of the former tree structure with the latter tree structure. The structure storage unit 122 may store, for example, a case where a certain class depends on two installations through an interface in the source code but only a definition which depends on a single installation exists among the definitions described in the definition file, as the structure mismatching. The structure storage unit 122 may store, for example, a case where a certain installation is defined in the definitions described in a definition file but a corresponding installation does not exist in the source code, as the structure mismatching.

The name space storage unit 123 stores a package name of the installed program, that is, an identifier. The name space storage unit 123 stores package names, for example, p1, p2, and p3 as the package name of the installed program. That is, the name space storage unit 123 stores the package name of the installed program contained in the source code.

The annotation rule storage unit 124 defines and stores annotations to be inserted to the source code and a relevant source code which corresponds to the installed program. The annotation rule storage unit 124 defines and stores annotations in such a way that, for example, the "@autowired" is inserted to a class which depends on the installation and "@component" is inserted to an installation on which the class depends.

The source code storage unit 125 stores the source code after being shifted from the scheme of making correspondence by the definition file to that of making correspondence by the annotation. That is, the source code storage unit 125 stores the source code in which the annotation is inserted.

The relationship table storage unit 126 stores installations by making correspondence between the installation and each interface. FIG. 3 is an explanatory diagram illustrating an example of a relationship table storage unit. As illustrated in FIG. 3, the relationship table storage unit 126 includes items, such as an interface 126*a*, an installation (default) 126*b*, an installation 126*c*, and an installation 126*d*. The relationship table storage unit 126 is loaded when the DI container executes the program and any one of the installation (default) 126*b*, the installation 126*c*, and the installation 126*d* is selected. The installations 126*b* to 126*d* may designate a search range definition which defines a range used for an installed program search, and switch between the installed programs to be used, according to the installations 126*b* to 126*d*. That is, the relationship table storage unit 126 stores the identifier of the installed program, which is specified based on the descriptions of the source code including the relevant source code corresponding to the installed program, in association with each of interfaces.

The interface 126*a* indicates an interface used by a class. The installation (default) 126*b* indicates the installed program related to each interface for a case where a default is set, and includes elements such as a "definition name", a "package name", and a "class name". The "definition name" is a definition name of a search range definition used for a program search by the DI container. The "package name" identifies the installed program. The "class name" identifies a service provided by the installed program. For example, in the installed program set at a default for interface C in FIG. 3, a definition name, the package name, and the class name for being searched by the DI container are "def1", "p1", and "C service", respectively. Similarly to the installation (default) 126*b*, the installation 126*c* and the installation 126*d* indicate the installed programs related to respective interfaces, and include the elements such as the "definition name", the "package name", and the "class name". The installation 126*c* and the installation 126*d* are presented to a user who activates the program as selection items when the DI container executes the program.

Referring back to FIG. 2, the definition file storage unit 127 stores the definition file after being shifted from the scheme of making correspondence by the definition file to that of making correspondence by the annotation. That is, the definition file storage unit 127 stores an updated definition file in which descriptions on dependencies of the class is deleted from the definition file input from the input unit 110.

The program storage unit 128 stores an executable program which is a code created through compilation of the source code, in which the annotation is inserted, in the compilation unit 134, and executable by the DI container.

The control unit 130 is implemented in such a way that the program stored in an internal storage device is executed, using a RAM as a working area, by, for example, a CPU (Central Processing Unit) and an MPU (Micro Processing Unit). Further, the control unit 130 may be implemented by an integrated circuit such as, an ASIC (Application Specific Integrated Circuit) or a FPGA (Field Programmable Gate Array). The control unit 130 includes a structure analysis unit 131, a scanning unit 132, a creation unit 133, a compilation unit 134, an execution analysis unit 135, a determination unit 136, and an execution unit 137, and implements or executes functionalities or operations of the information processing which will be described. Further, the internal configuration of the control unit 130 is not limited to the configuration illustrated in FIG. 2 and may include other configuration as long as the configuration is able to perform the information processing which will be described later.

Figure 4:
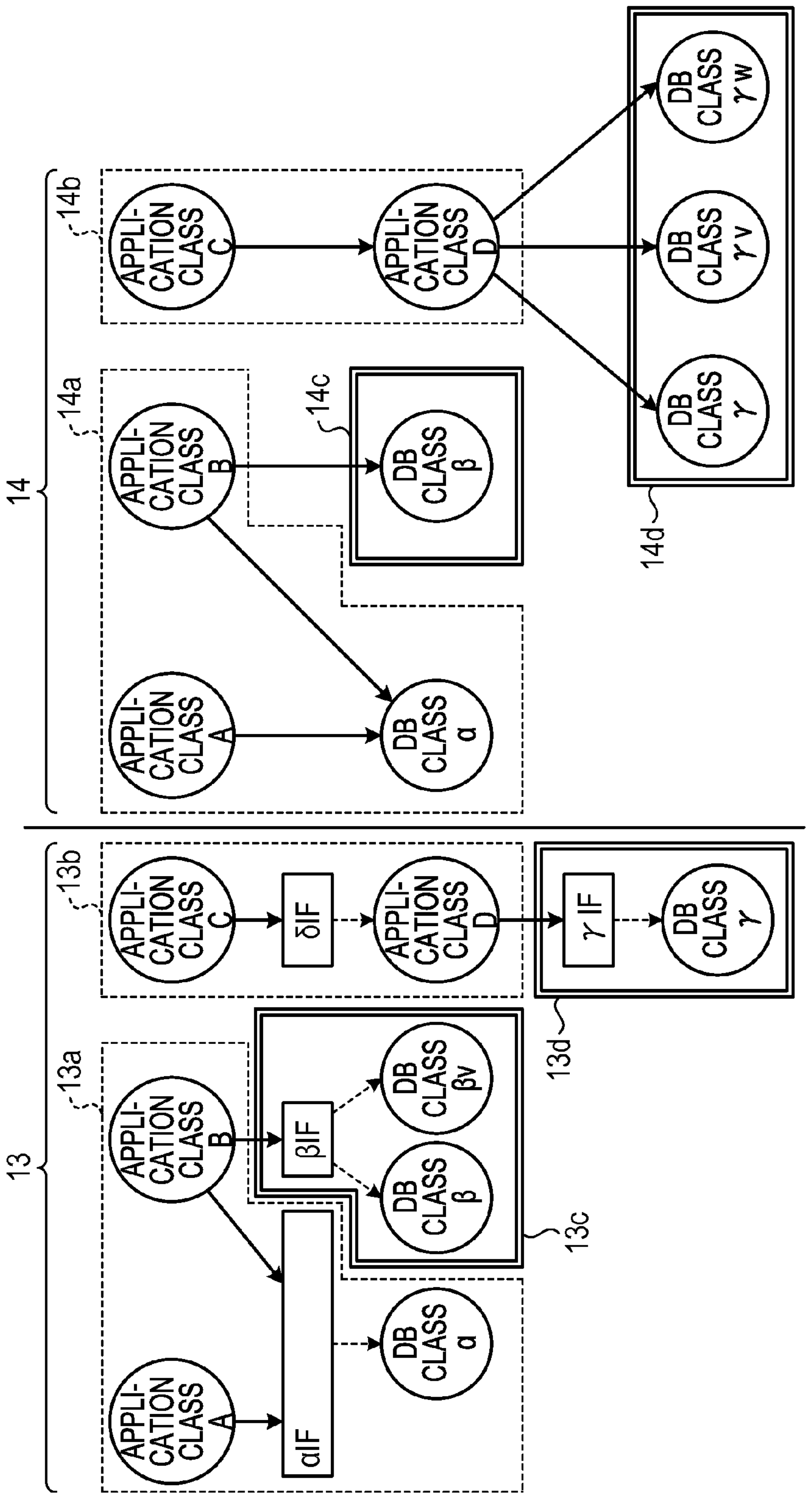
FIG. 4 is an explanatory diagram illustrating an example of tree structures of a source code and a definition file, according to an embodiment.

When the source code and the definition file are input from the input unit 110, the structure analysis unit 131 analyzes the source code and the definitions described in the definition file to create tree structures. FIG. 4 is an explanatory diagram illustrating examples of the tree structures of a source code and a definition file. As illustrated in FIG. 4, the tree structures created by analyzing the definitions are, for example, the tree structure 13 created by analyzing the source code and the tree structure 14 created by analyzing the definitions described in the definition file. For example, the tree structure 13 includes application class A, application class B, application class C, and application class D in which an interface δIF is installed. Further, the tree structure 13 includes a DB class α in which an interface αIF is installed, a DB class β and DB class βv in each of which an interface βIF is installed, and a DB class γ in which an interface γIF is installed.

For example, the tree structure 14 includes the application class A, the application class B, the application class C, and the application class D. Further, the tree structure 14 includes a DB class α, a DB class β, and DB classes γ, γv, and γw. The structure analysis unit 131 stores the tree structures created by analyzing the source code and the definitions described in the definition file in the analysis result storage unit 121, and outputs an analysis completion information to the scanning unit 132. Further, the structure analysis unit 131 stores the source code and the definition file in the buffer of the storage unit 120.

Referring back to FIG. 2, when the analysis completion information is input from the structure analysis unit 131, the scanning unit 132 reads the tree structures created by analyzing the source code and the definitions described in the definition file, from the analysis result storage unit 121, scans the read tree structures, and specifies a matched portion and a mismatched portion between the tree structures. In the example of FIG. 4, since the tree structure 13*a* of the source code matches with the tree structure 14*a* of the definitions, the scanning unit 132 makes correspondence between the tree structure 13*a* and the tree structure 14*a* and stores the tree structures 13*a* and 14*a* in the structure storage unit 122 as the structure matching. Similarly, since the tree structure 13*b* of the source code matches with the tree structure 14*b* of the definitions, the scanning unit 132 makes correspondence between the tree structure 13*b* and the tree structure 14*b*, and stores the tree structures 13*b* and 14*b* in the structure storage unit 122 as the structure matching.

Further, in the example of FIG. 4, since the tree structure 13*c* of the source code does not match with the tree structure 14*c* of the definitions, the scanning unit 132 makes correspondence between the tree structure 13*c* and the tree structure 14*c*, and stores the tree structures 13*c* and 14*c* in the structure storage unit 122 as the structure mismatching. Similarly, since the tree structure 13*d* of the source code does not match with the tree structure 14*d* of the definitions, the scanning unit 132 makes correspondence between the tree structure 13*d* and the tree structure 14*d*, and stores the tree structures 13*d* and 14*d* in the structure storage unit 122 as the structure mismatching.

Further, upon receiving an instruction to scan a name space from the creation unit 133, the scanning unit 132 refers to the structure storage unit 122 to determine a portion to be scanned, scans an analysis result for a package name of the installed program, and extracts the package name of the installed program contained in the analysis result. The scanning unit 132 stores the package name of the extracted installed program in the name space storage unit 123. When the scanning for the structure or the package name is completed, the scanning unit 132 outputs the respective corresponding scanning completion information to the creation unit 133.

Referring back to FIG. 2, when the scanning completion information according to the structure is input from the scanning unit 132, the creation unit 133 refers to the structure storage unit 122 to create a relationship table. That is, the creation unit 133 creates an installation of the relationship table which defines one or more search range definitions for each interface. In other words, the creation unit 133 associates the identifiers of the installed programs that are specified based on the descriptions of the source code including a relevant source code corresponding to the installed program, with each interface. The creation unit 133 stores the created relationship table in the relationship table storage unit 126. When there exists a portion of the tree structure which is described only in the source code, among the tree structures of the source code and the definitions read from the structure storage unit 122, the creation unit 133 instructs the scanning unit 132 to scan the name space. When the scanning completion information according to the package name is input from the scanning unit 132, the creation unit 133 executes a search priority process.

Further, the creation unit 133 reads the source code and the definition file from the buffer of the storage unit 120, and creates the source code in which the annotation is inserted and an updated definition file. The creation unit 133 refers to the structure storage unit 122, the name space storage unit 123, and the annotation rule storage unit 124, and inserts the annotation into the source code. The creation unit 133 adds a search range definition to the definition file according to a search priority and deletes a definition of the relationship between classes from the definition file. The creation unit 133 stores the source code in which the created annotation is inserted in the source code storage unit 125 and stores the updated definition file in the definition file storage unit 127. When the creation of the relationship table, the source code in which the created annotation is inserted, and the updated definition file is completed, the creation unit 133 outputs a creation completion information to the compilation unit 134. In the following description, the source code in which the annotation is inserted will be also referred to as the annotation-added source code.

Figure 5:
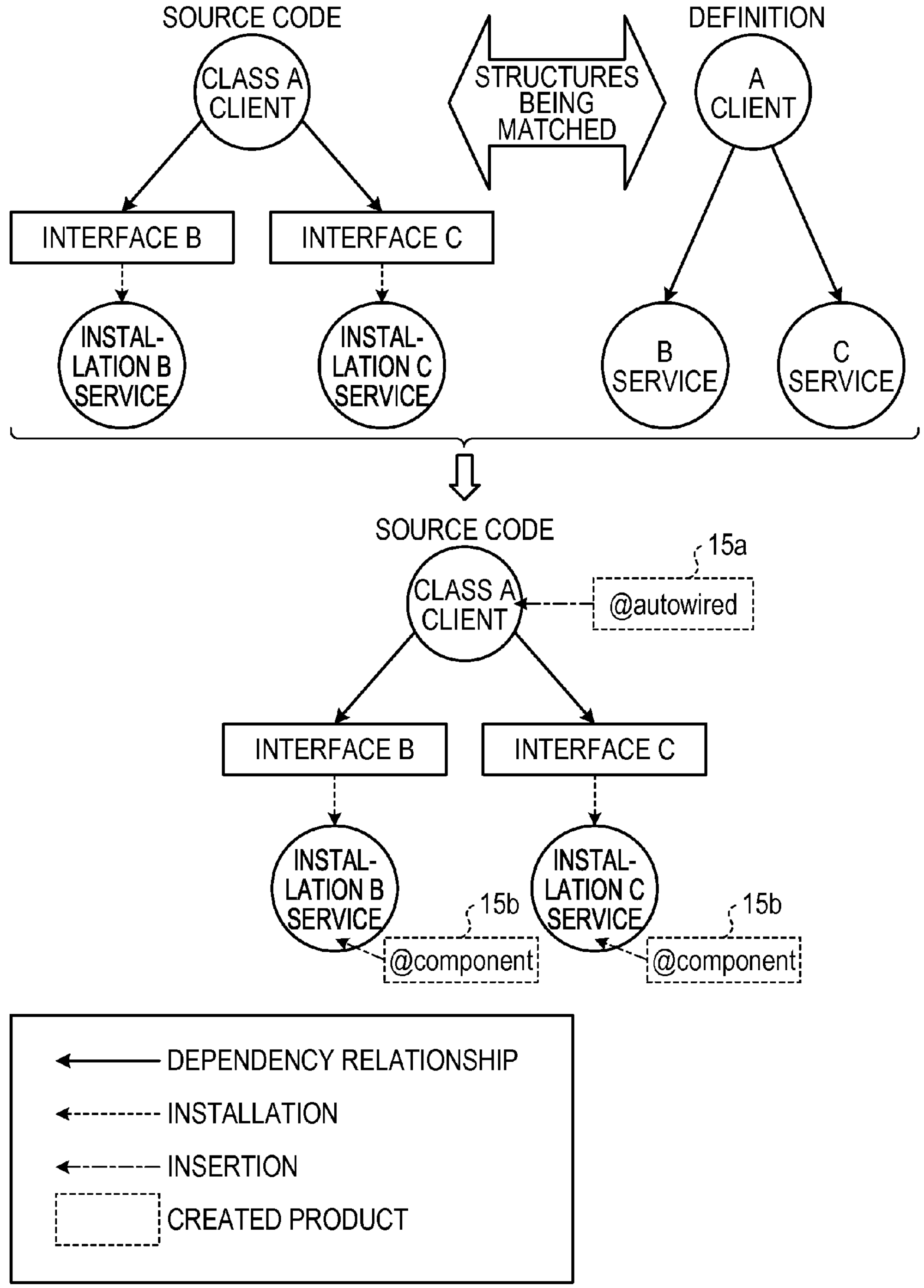
FIG. 5 is an explanatory diagram illustrating an example of a case where tree structures match with each other, according to an embodiment.

FIG. 5 is an explanatory diagram illustrating an example of a case where the tree structures match with each other. As illustrated in FIG. 5, when the tree structure of the source code matches with that of the definitions described in the definition file, the creation unit 133 inserts, for example, an annotation 15*a* of "@autowired" into the class A client of the source code. Further, the creation unit 133 inserts an annotation 15*b* of "@component" into the installation B service and the installation C service of the source code.

Figure 6:
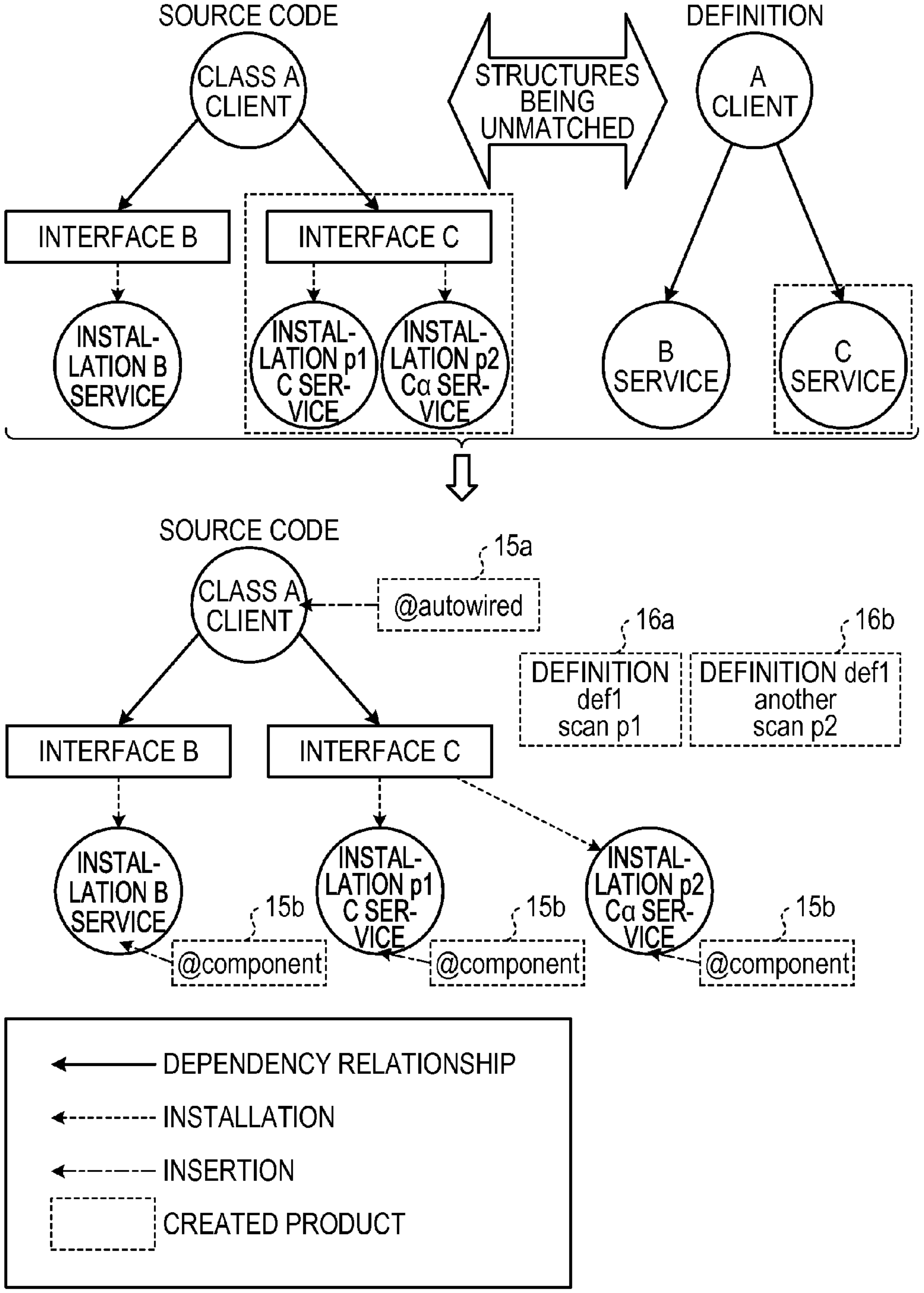
FIG. 6 is an explanatory diagram illustrating an example of a case where the tree structures do not match with each other, according to an embodiment.

FIG. 6 is an explanatory diagram illustrating an example of a case where the tree structures do not match with each other. As illustrated in FIG. 6, descriptions will be made on, for example, a case where C service of installation p1 and Cα service of installation p2 exist in the source code as installations having an interface C, and the C service exists in the corresponding definition. When the tree structure of the source code does not match with that of the definitions described in the definition file, the creation unit 133 defines, for example, "scan p1" as "definition def1" to be defined as the search range definition 16*a*, and adds the "scan p1" to the definition file. Further, the creation unit 133 defines, for example, "scan p2" as "definition def1 another" to be defined as the search range definition 16*b*, and adds the "scan p2" to the definition file. Here, the "definition def1" is a definition used for searching for the installation p1 by the DI container at the time of searching for the installed program. Further, the "definition def1 another" is a definition used for searching for the installation p2 by the DI container at the time of searching for the installed program. That is, the "definition def1" and the "definition def1 another" are the search range definitions for each name space of the installed program, respectively.

Next, the creation unit 133 inserts the annotation 15*a* of "@autowired" into, for example, the class A client of the source code. Further, the creation unit 133 inserts the annotation 15*b* of "@component" into the installation B service, the C service of the installation p1, and Cα service of the installation p2 of the source code.

Figure 7:
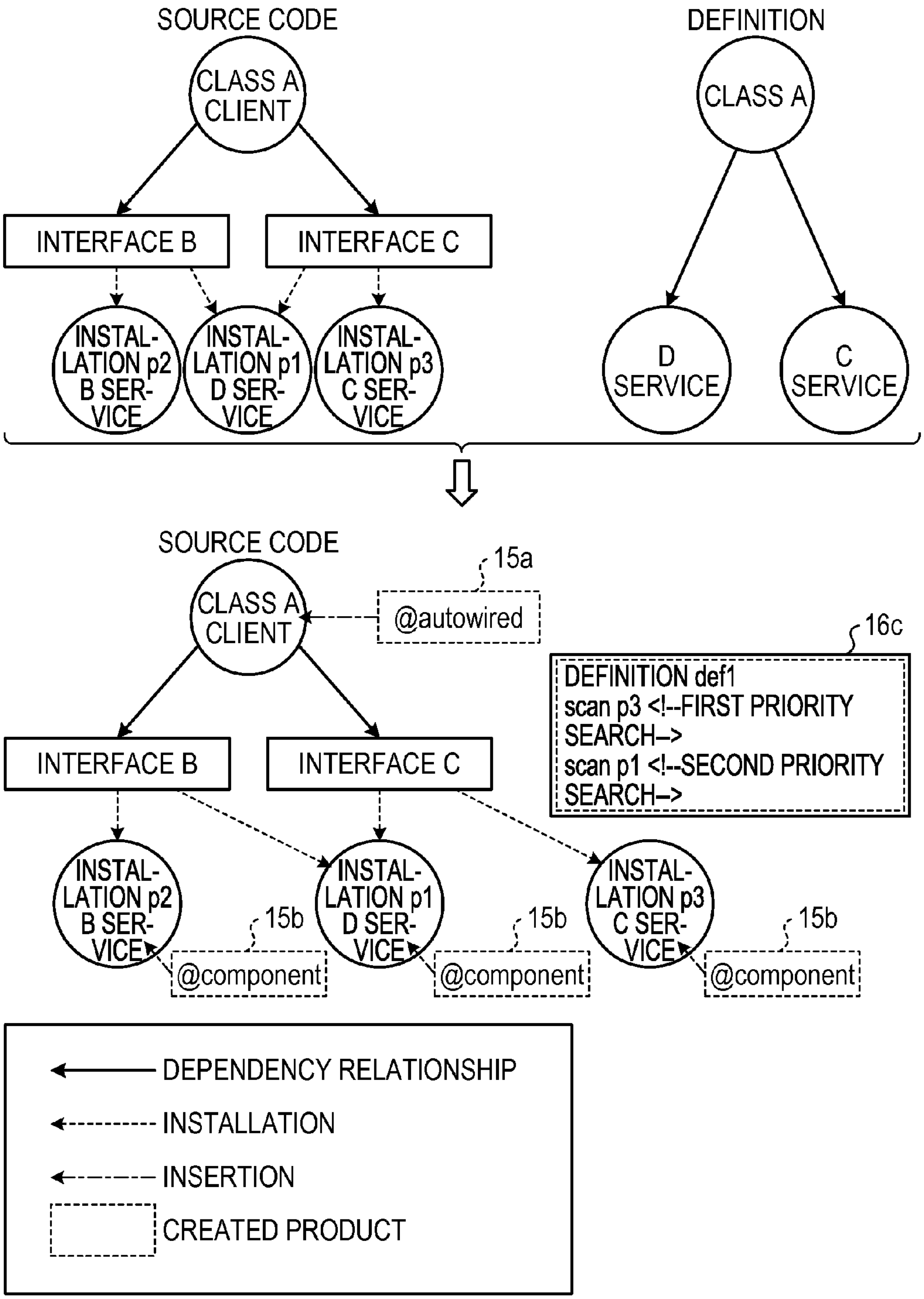
FIG. 7 is an explanatory diagram illustrating an example of a case where a single installation has a plurality of interfaces, according to an embodiment.

FIG. 7 is an explanatory diagram illustrating an example of a case where a single installation has a plurality of interfaces. As illustrated in FIG. 7, for example, in the source code, B service of an installation p2 having interface B and C service of an installation p3 having interface C exist as installations that the class A client depends on. Further, in the source code, D service of an installation p1 having the interfaces B and C exists as the installations that the class A client depends on. Further, for example, in the definition, as the installations that the class A client depends on, class A, the C service and the D service exist. As described above, a single installation may have a plurality of interfaces in, for example, Java (registered trademark).

The creation unit 133 adds the search range definition to the definition file. In this case, when, for example, the "scan p1" is described as the search range definition, the creation unit 133 first searches for the D service of the installation p1 as an installation for interface B. When doing so, since the installation p1 also has the interface C, the creation unit 133 also searches for the D service of the installation p1 also as the installation for the interface C and thus, the C service of the installation p3 is not searched.

Therefore, the creation unit 133 makes a search priority S of the "scan p3" higher than that of the "scan p1" for the "scan p3" and "scan p1" as the "definition def1," and adds the "scan p3" and "scan p1 to the definition file as the search range definition 16*c*. Here, the search priority S of the installation is made higher as the number of interfaces installed in the class becomes smaller, and the search priority S becomes the highest priority in a case where the number of interfaces installed in the class is single. In the case, the search priority S becomes higher as the value thereof becomes smaller, and the search priority S becomes lower as the value thereof becomes larger.

The creation unit 133 assigns the search priority S in the following procedural sequences as the search priority process. It is assumed that in the tree structure of the source code, class A depends on class Z in which an interface IntF1 is installed and N−1 interfaces other than the interface IntF1 are installed in the class Z. Further, it is assumed that the number of installed interfaces is N. First of all, the creation unit 133 determines whether the number N of installed interfaces is equal to one (i.e., N=1). When it is determined that N=1, that is, other interfaces are not installed in the class Z except for the interface IntF1, the creation unit 133 sets the search priority S of the class Z to zero (i.e., S=0). That is, the creation unit 133 sets the search priority S to the highest priority.

When the number N of installed interfaces is not equal to one (i.e., N≠1), that is, N is larger than one (i.e., N>1), the creation unit 133 determines whether dependencies of the class A exist in an interface other than the interface IntF1. When it is determined that the dependencies of the class A does not exist, the creation unit 133 sets the search priority S of the class Z at one, that is, S=1. When the dependencies of the class A exist, the creation unit 133 determines whether a search priority P is assigned to the installation that the class A depends on. Here, the search priority P corresponds to the search priority S in the installation and is denoted with a different letter in order to distinguish the search priority P from the search priority S of the class Z.

When the search priority P is assigned to the installation that the class A depends on, the creation unit 133 sets the search priority S at "S=P+1". When the search priority P is not assigned to the installation that the class A depends on, the creation unit 133 waits until the search priority P is assigned to the installation of a dependency destination. By doing so, the creation unit 133 assigns the search priority S to each installation.

In the example of FIG. 7, since the interface B is installed in the installation p2, the creation unit 133 sets the search priority for the installation p2 at "0". Since the interface C is installed in the installation p3, the creation unit 133 sets the search priority for the installation p3 at "0". Since the interface B and the interface C are installed in the installation p1, for example, when assuming the interface B as a reference, it is determined whether dependencies of the class A client exist in the interface C. Since the dependencies of the class A client exist in the interface C, it is determined whether the search priority P is assigned to the installation p3 that the class A client depends on. Since "0" is already assigned to the installation p3 as the search priority P, the search priority S of the installation p1 becomes "1" due to the "S=P+1". Accordingly, as the search range definition 16*c*, the "scan p3" which searches for the installation p3 may be executed earlier than "scan p1" which searches for the installation p3, that is, the installation p3 may be searched for earlier than the installation p1.

Next, the creation unit 133 inserts the annotation 15*a* of the "@autowired" into, for example, the class A client of the source code. Further, the creation unit 133 inserts the annotation 15*b* of the "@component" into the B service of the installation p2, the D service of the installation p1, and the C service of the installation p3.

Figure 8:
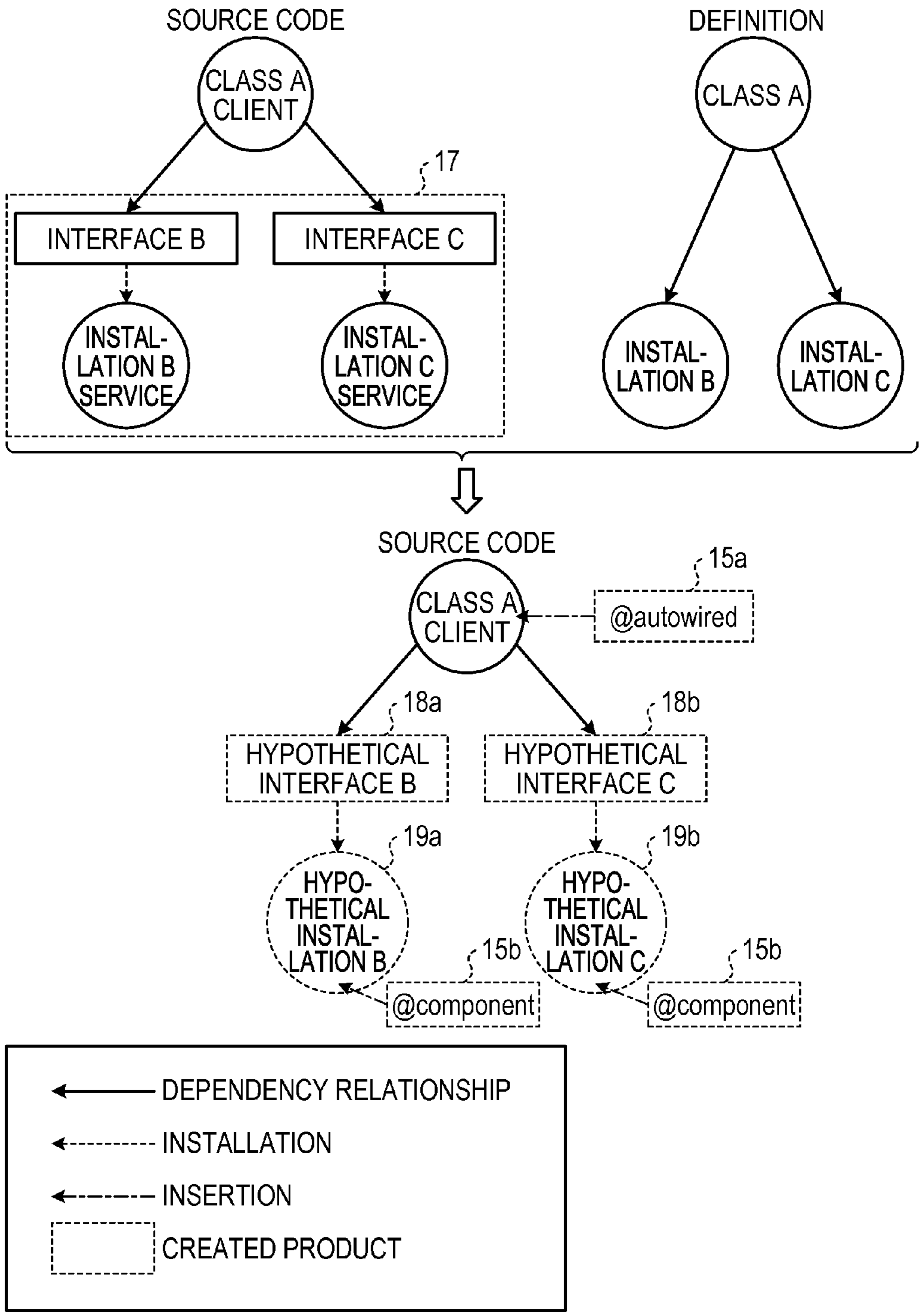
FIG. 8 is an explanatory diagram illustrating an example of a case where an uninstalled portion exists in the source code, according to an embodiment.

FIG. 8 is an explanatory diagram illustrating an example of a case where an uninstalled portion exists in the source code. As illustrated in FIG. 8, only the class A client exists in, for example, the source code. An uninstalled portion 17 includes installation B service having interface B and installation C service having interface C, and these services and interfaces are not installed in the source code. Further, for example, the installation B and the installation C exist in the definition as installations that the class A depends on. The creation unit 133 creates a hypothetical interface 18*a* as a hypothetical interface B and a hypothetical interface 18*b* as a hypothetical interface C such that information of the installation B and the installation C are not missed when shifting from the scheme of making correspondence by the definition to the scheme of making correspondence by the annotation. Further, the creation unit 133 creates a hypothetical installation 19*a* as a hypothetical installation B and a hypothetical installation 19*b* as a hypothetical installation C.

The creation unit 133 inserts, for example, the annotation 15*a* of "@autowired" into the class A client of the source code. Further, the creation unit 133 inserts the annotation 15*b* of "@component" into the hypothetical installation 19*a* and the hypothetical installation 19*b* of the source code.

FIG. 9 is an explanatory diagram illustrating an example of updating of a definition file. As illustrated in FIG. 9, a definition 20 of a dependency relationship between classes becomes unnecessary due to the shifting to the scheme of making correspondence by the annotation and is deleted from the definition file. Further, a search range definition 21 is added to the definition file due to the shifting to the scheme of making correspondence by the annotation. In the example of FIG. 9, the scheme of making correspondence by the definition file is shifted to the scheme of making correspondence by the annotation so that twelve tags are deleted and two tags are added. As described above, shifting to the scheme of making correspondence by the annotation may cause the reduction of the amount of definitions. Further, since a relationship between classes is defined individually in the definition of the dependency relationship between classes, when the number of class relationships increases, the description for the class relationship becomes enormous, but the descriptions of the search range definition are made in package unit and thus readability also increases in the search range definition. Further, the information processing apparatus 100 may incorporate and configure the structure analysis unit 131, the scanning unit 132, and the creation unit 133 as a first specifying unit.

When a creation completion information is input from the creation unit 133, the compilation unit 134 reads the source code in which the annotation is inserted from the source code storage unit 125 and creates a compiled program executable by the DI container, that is, an executable program. The compilation unit 134 stores the created executable program in the program storage unit 128. When the compilation of the source code in which the annotation is inserted is completed, the compilation unit 134 outputs the compilation completion information to the execution analysis unit 135. Further, the compilation unit 134 may display the compilation completion information on the displaying device through the output unit 111 which is not illustrated and notify the compilation completion information to a user. Further, the compilation unit 134 may instruct the execution analysis unit 135 to start analysis based on, for example, an execution start instruction input from an input device (not illustrated) by the user.

When the compilation completion information is input from the compilation unit 134, the execution analysis unit 135 reads the executable program from the program storage unit 128, and analyzes the read executable program. Further, the execution analysis unit 135 reads the updated definition file from the definition file storage unit 127 and analyzes it. Further, the execution analysis unit 135 reads the relationship table from the relationship table storage unit 126 and analyzes it. The execution analysis unit 135 outputs respective analysis results to the determination unit 136. Further, the execution analysis unit 135 outputs the executable program and the definition file to the execution unit 137.

When the respective analysis results are input from the execution analysis unit 135, the determination unit 136 presents the installation which is a selective item of the relationship table to a user who activates the program, by displaying the installation on the displaying device (not illustrated) through the output unit 111. The determination unit 136 causes the user who activates the program, to select the search range definition of the installation to be used, from the relationship table for each interface, and acquires the selected information input from the input device (not illustrated). The determination unit 136 determines the installation to be used, that is, the search range definition to be used, based on the selected information. The determination unit 136 outputs information of the determined installation to the execution unit 137. That is, the execution analysis unit 135 and the determination unit 136 act as a second specifying unit which specifies the interface executed upon execution of the source code based on the contents defined in the source code.

When the installation information is input from the determination unit 136, and the executable program and the definition file are input from the execution analysis unit 135, the execution unit 137 searches for the installation based on the installation information and the definition file. The execution unit 137 performs associating dependent classes with each other based on the searched installation. That is, the execution unit 137 makes it possible to identify an installed program related to the interface. Subsequently, the execution unit 137 executes the executable program. The execution unit 137 outputs the execution result data to the output unit 111 and displays the result data on, for example, a displaying device which is not illustrated. In other words, the execution unit 137 is an output control unit which, upon execution of the program based on the source code, outputs information on the installed program whose identifier is stored in the relationship table storage unit 126 in association with the specified interface, so that the installed program is identifiable.

Next, descriptions will be made on operations of the information processing apparatus 100 according to the embodiment.

Figure 10:
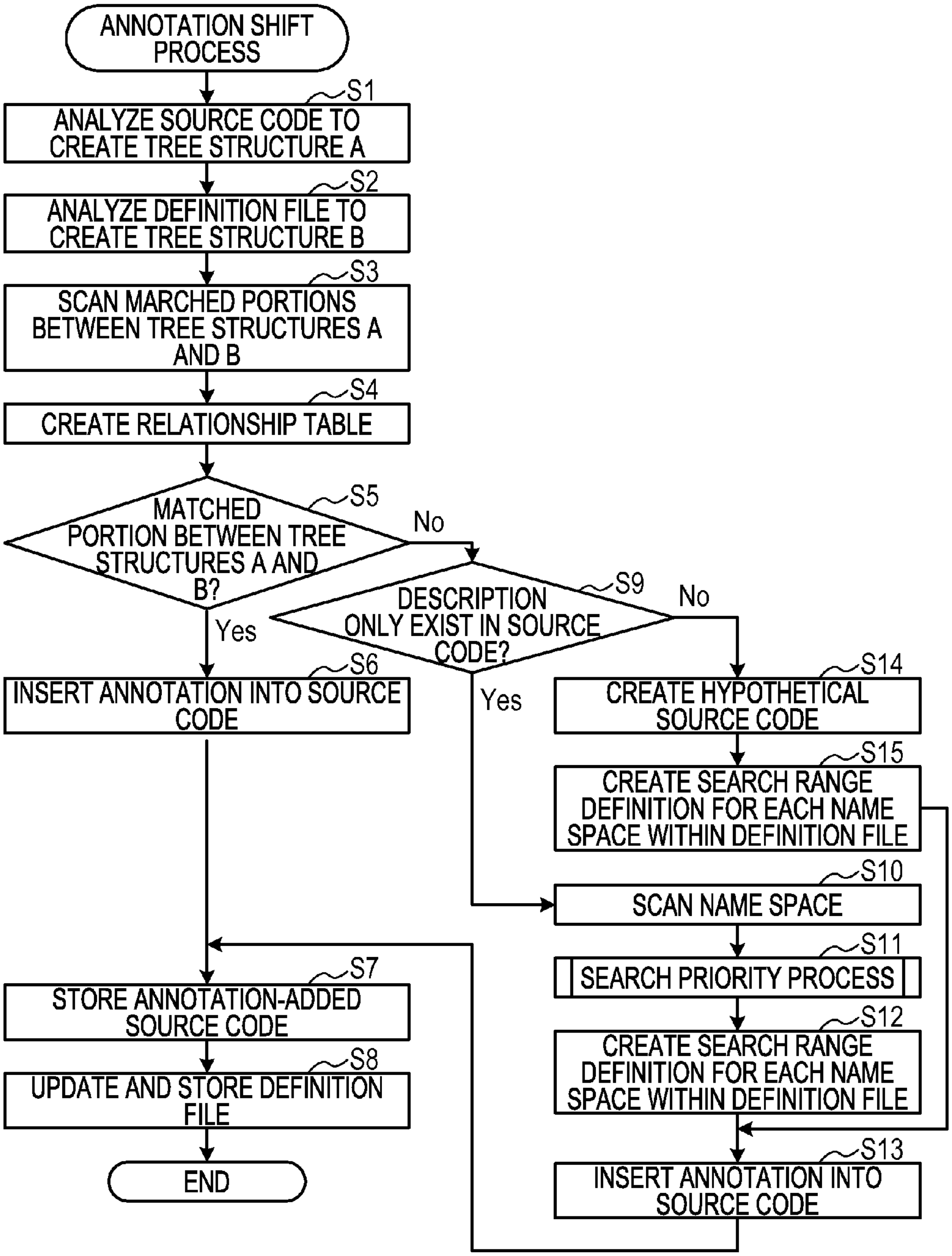
FIG. 10 is a flowchart illustrating an example of an annotation shift process, according to an embodiment.

First of all, descriptions will be made on an annotation shift process in which a scheme of making correspondence between the interface and the installed program by a definition file is shifted to a scheme of making correspondence between the interface and the installed program by an annotation. FIG. 10 is a flowchart illustrating an example of an annotation shift process. When the source code and the definition file are input from the input unit 110, the structure analysis unit 131 analyzes the source code to create tree structure A (step S1). Further, the structure analysis unit 131 analyzes the definition file to create tree structure B (step S2). The structure analysis unit 131 stores the tree structures A and B created from the source code and the definition file in the analysis result storage unit 121, and outputs the analysis completion information to the scanning unit 132. Further, the structure analysis unit 131 stores the source code and definition file in the buffer of the storage unit 120.

When the analysis completion information is input from the structure analysis unit 131, the scanning unit 132 reads and scans the tree structures created from the source code and the definition file from the analysis result storage unit 121 and specifies a matched portion and a mismatched portion between the tree structures (step S3). The scanning unit 132 makes correspondence between the tree structure of the source code and the tree structure of the definition file, and stores respective matched and mismatched portions of the tree structures in the structure storage unit 122 as a structure match or a structure mismatch, respectively. When the scanning of the structure is completed, the scanning unit 132 outputs the scanning completion information regarding the structure to the creation unit 133.

When the scanning completion information regarding the structure is input from the scanning unit 132, the creation unit 133 refers to the structure storage unit 122 and the name space storage unit 123 to create the relationship table (step S4). The creation unit 133 stores the created relationship table in the relationship table storage unit 126. The creation unit 133 refers to the structure storage unit 122, and determines whether the respective portions of the tree structures A and B correspond to the matched portions (step S5). When it is determined that each portion of the tree structures A and B corresponds to the matched portion ("Yes" at step S5), the creation unit 133 refers to the structure storage unit 122, the name space storage unit 123, and the annotation rule storage unit 124, and inserts the annotation into the source code (step S6). Further, the creation unit 133 updates the definition file by creating the search range definition for each name space within the definition file and deleting the definition of the class relationship.

The creation unit 133 stores the created annotation-added source code in the source code storage unit 125 (step S7). Further, the creation unit 133 stores the updated definition file in the definition file storage unit 127 (step S8), and ends the annotation shift process. When the annotation shift process is ended, the creation unit 133 outputs the creation completion information to the compilation unit 134.

When the creation completion information is input from the creation unit 133, the compilation unit 134 reads the annotation-added source code from the source code storage unit 125 to create the executable program. The compilation unit 134 stores the created executable program in the program storage unit 128.

Referring back to the descriptions of step S5, when it is determined that each portion of the tree structures does not correspond to the matched portion ("No" at step S5), the creation unit 133 determines whether the mismatched portion is described only in the source code (step S9). When it is determined that the mismatched portion is described only in the source code ("Yes" at step S9), the creation unit 133 instructs the scanning unit 132 to scan the name space (step S10). When an instruction to scan the name space is received from the creation unit 133, the scanning unit 132 scans the analysis result for the package name of the installed program and extracts the package name of the installed program contained in the analysis result. The scanning unit 132 stores the package name of the extracted installed program in the name space storage unit 123. When the scanning of the package name is completed, the scanning unit 132 outputs the scanning completion information for the package name to the creation unit 133.

Figure 11:
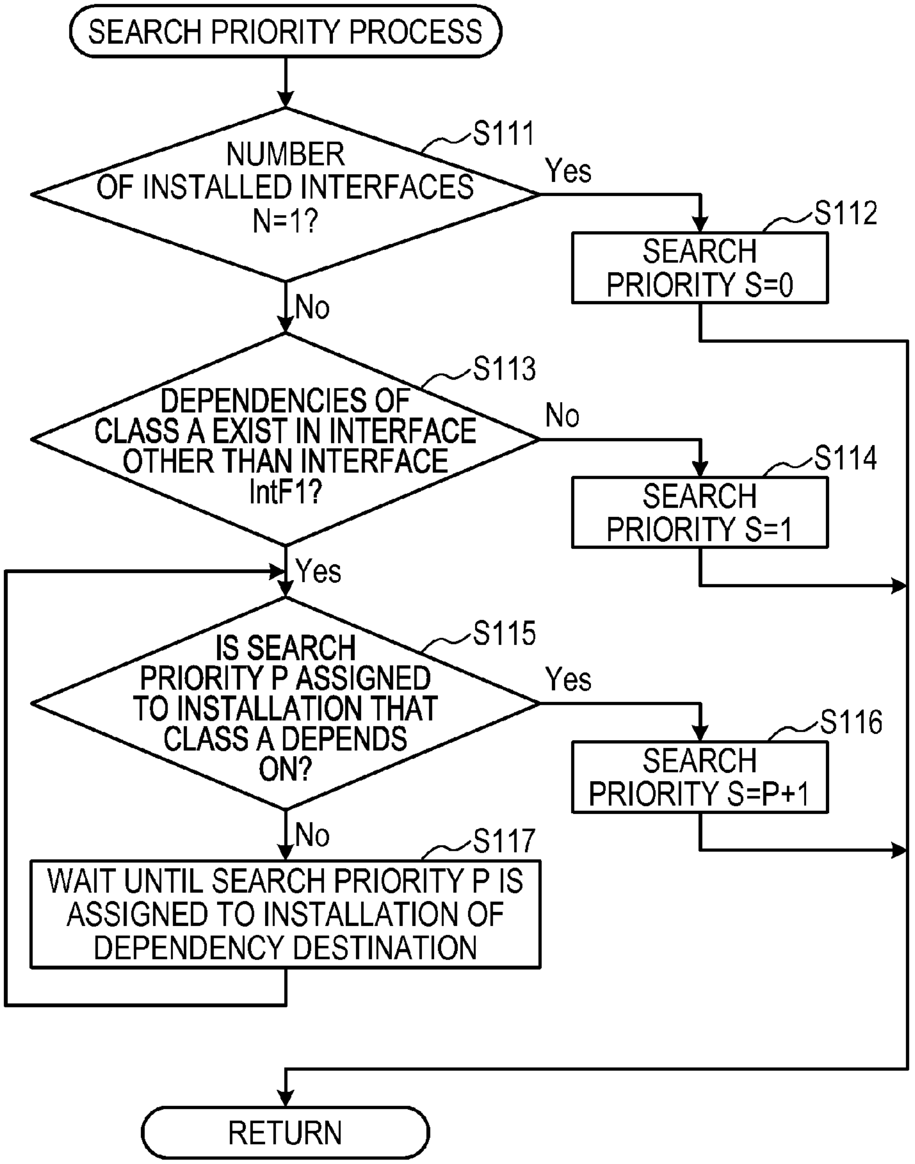
FIG. 11 is a flowchart illustrating an example of a search priority process, according to an embodiment.

When the scanning completion information for the package name is input from the scanning unit 132, the creation unit 133 executes the search priority process (step S11). FIG. 11 is a flowchart illustrating an example of the search priority process. In the case, descriptions for a prerequisite of the search priority process are the same as those for the assignment of the search priority S. The creation unit 133 determines whether the number of installed interfaces is equal to 1 (i.e, N=1) (step S111). When it is determined that N=1 ("Yes" at step S11), the creation unit 133 sets the search priority S of the class Z at zero (i.e, S=0) (step S112). When the search priority S is determined, the creation unit 133 goes back to the search priority process.

When it is determined that N is larger than one (i.e., N>1) ("No" at step S111), the creation unit 133 determines whether the dependencies of the class A exist in an interface other than the interface IntF1 (step S113). When it is determined that the dependencies of the class A do not exist ("No" at step S113), the creation unit 133 sets the search priority S of the class Z at 1 (i.e., S=1) (step S114). When the search priority S is determined, the creation unit 133 goes back to the search priority process.

When it is determined that the dependencies of the class A exist ("Yes" at step S113), the creation unit 133 determines whether the search priority P is assigned to the installation that the class A depends on (step S115). When it is determined that the search priority P is assigned to the installation that the class A depends on ("Yes" at step S115), the creation unit 133 sets the search priority S at "S=P+1" (step S116). When the search priority S is determined, the creation unit 133 goes back to the search priority process.

When it is determined that the search priority P is not assigned to the installation that the class A depends on ("No" at step S115), the creation unit 133 waits until the search priority P is assigned to the installation of the dependency destination (step S117), and goes back to step S115. Accordingly, an appropriate installation may be searched even for a case where a single installation has a plurality of interfaces.

Referring back to FIG. 10, the creation unit 133 creates the search range definition for each name space within the definition file according to the search priority and updates the definition file (step S12). Further, the creation unit 133 deletes the definition of class relationship from the definition file.

The creation unit 133 refers to the structure storage unit 122, the name space storage unit 123, and the annotation rule storage unit 124 to insert the annotation into the source code (step S13), and goes back to step S7.

When it is determined that the mismatched portion is not described only in the source code ("No" at step S9), the creation unit 133 creates a hypothetical interface and a hypothetical installation on the ground that the uninstalled portion exists in the source code. That is, the creation unit 133 creates the hypothetical source code in the uninstalled portion of the source code (step S14). The creation unit 133 creates the search range definition for each name space within the definition file and updates the definition file (step S15). Further, the creation unit 133 deletes the definition of class relationship from the definition file, and proceeds to step S13. Accordingly, it is possible to create the annotation-added source code from the source code that uses the definition file in which the dependency relationship between classes is described.

Figure 12:
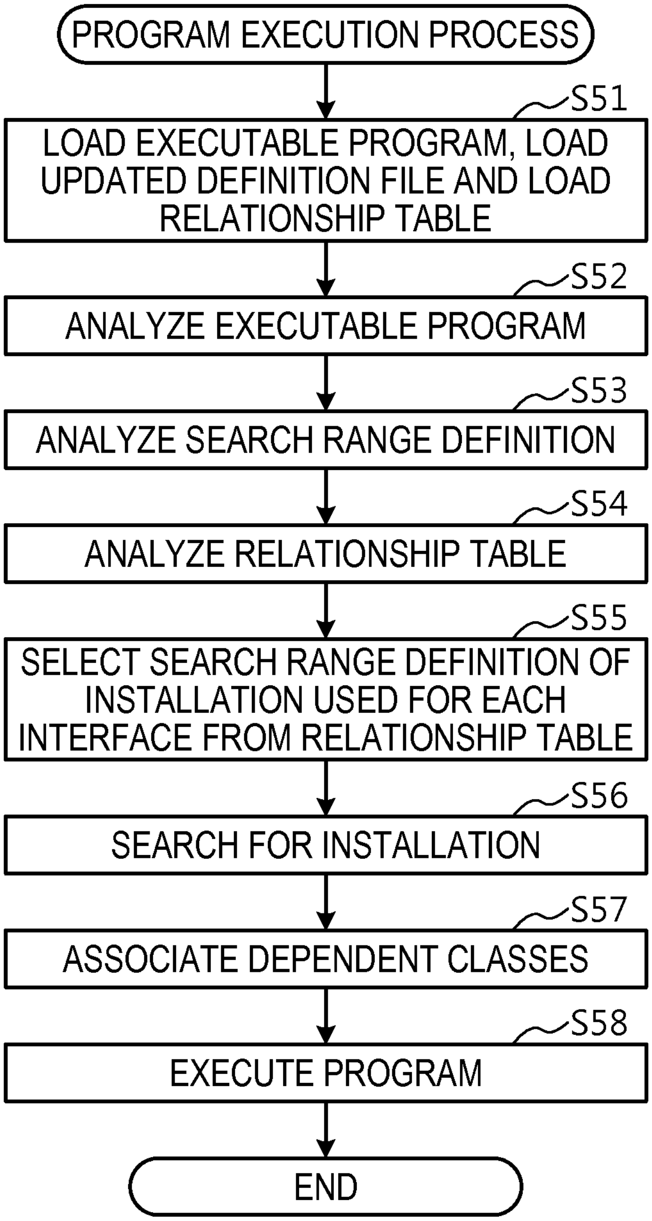
FIG. 12 is a flowchart illustrating an example of a program execution process, according to an embodiment.

Next, descriptions will be made on a program execution process for executing an executable program into which the created annotation-added source code is compiled by the compilation unit 134. FIG. 12 is a flowchart illustrating an example of a program execution process. When the compilation completion information is input from the compilation unit 134, the execution analysis unit 135 loads the executable program from the program storage unit 128. Further, the execution analysis unit 135 loads the updated definition file from the definition file storage unit 127. Further, the execution analysis unit 135 loads the relationship table from the relationship table storage unit 126 (step S51).

When the executable program is loaded, the execution analysis unit 135 analyzes the executable program (step S52). When the updated definition file is loaded, the execution analysis unit 135 analyzes the search range definition within the definition file (step S53). When the relationship table is loaded, the execution analysis unit 135 analyzes the relationship table, that is, the relationship between classes (step S54). The execution analysis unit 135 outputs each analysis result to the determination unit 136. Further, the execution analysis unit 135 outputs the executable program and the definition file to the execution unit 137.

When each analysis result is input from the execution analysis unit 135, the determination unit 136 presents the installation which is the selection item of the relationship table to a user who activates the program, by displaying the installation on the displaying device which is not illustrated, through the output unit 111. The determination unit 136 causes the user who activates the program to select the search range definition of the installation used for each interface from the relationship table, and acquires the selected information input from the input device which is not illustrated (step S55). The determination unit 136 determines the installation to be used, that is, the search range definition to be used, based on the selected information. The determination unit 136 outputs the information of the determined installation to the execution unit 137.

When the information of installation is input from the determination unit 136 and the executable program and the definition file are input from the execution analysis unit 135, the execution unit 137 searches for the installation based on the information of installation and the definition file (step S56). The execution unit 137 performs associating the dependent classes with each other based on the searched installation (step S57). Subsequently, the execution unit 137 executes the executable program (step S58). The execution unit 137 outputs the execution result data to the output unit 111 to display the execution result data on, for example, the displaying device which is not illustrated, and ends the program execution process. Accordingly, it is possible to execute the executable program based on the annotation-added source code according to the search range definition of the selected installation.

As described above, the information processing apparatus 100 specifies the installed program related to the interface, based on the description of the source code including the relevant source code corresponding to the installed program, for each interface described in the source code. Further, the information processing apparatus 100 stores the identifier of the specified installed program in the relationship table storage unit 126 in association with the interface related to the installed program. Further, the information processing apparatus 100 specifies the interface which is executed upon execution of the source code, based on the contents defined in the source code. Further, the information processing apparatus 100 outputs, upon execution of the program based on the source code, information on the installed program whose identifier is stored in the relationship table storage unit 126 in association with the specified interface, so that the installed program is identifiable by a user. As a result, it is possible to make correspondence between the interface described in the source code and the installed program.

Further, the information processing apparatus 100 analyzes the source code and the definition file corresponding to the source code in order to create respective tree structures based on the source code and the definition file. Further, the information processing apparatus 100 scans the tree structure of the source code and the tree structure of the definition file, and scan the name space containing the name of the installed program. Further, the information processing apparatus 100 inserts the annotation, which is the identifier representing the correspondence between the interface and the installed program, into a source code to create the source code in which the annotation is inserted, based on the analysis result and the scanning result. Further, the information processing apparatus 100 specifies the installed program by taking the created source code as the source code including the relevant source code corresponding to the installed program. As a result, it is possible to make a correspondence between the interface and the installed program, according to the tree structures of the source code and the definition file.

Further, the information processing apparatus 100 creates a hypothetical tree structure for a lacking portion of the tree structure of the source code, which corresponds to an existing portion of the tree structure of the definition file. As a result, it is possible to prevent information of the definition file from missing upon shifting to the scheme of making correspondence by the annotation. Further, it is possible to perform switching between the installed classes without performing recompilation of the executable program. That is, even when being shifted to the annotation-added source code, for example, a test program and a regular program may be easily switched therebetween without being subjected to recompilation.

Further, the information processing apparatus 100 deletes the definition which corresponds to the annotation inserted into the source code from the definition file, and adds the search range definition which defines a range used for searching for the installed program to the definition file to create the updated definition file. As a result, descriptions on the class relationship, which may be enormous and complicated, may be reduced from the definition file, so that maintainability or readability is improved.

Further, when the installed program includes a plurality of interfaces, the information processing apparatus 100 scans the installed program based on the priority of the search range definition. As a result, it is possible to search for a suitable installed program and thus, the DI container may correctly incorporate a dependency. Further, an annotation insertion work by a person who prepares the source code becomes unnecessary and thus cost of work may be reduced.

Further, in the embodiments described above, the annotation-added source code is compiled to create the executable program after the annotation-added source code is created and the created executable program is executed, the present disclosure is not limited thereto. For example, the information processing apparatus 100 may create the definition file corresponding to the annotation-added source code and the relationship table and stop the processing at the time when the definition file and the relationship table are stored in the storage unit and thereafter, may perform the compilation. Further, similarly, the information processing apparatus 100 may stop the processing at the time when an executable program is created due to completion of the compilation and thereafter execute the executable program. Accordingly, the annotation-added source code and the executable program may be transmitted to other information processing apparatus to be compiled or executed by the other information processing apparatus.

Further, in the embodiments, the annotation shift process and the program execution process are performed by the information processing apparatus 100, but the present disclosure is not limited thereto. For example, the information processing apparatus 100 may execute the annotation shift process to create the annotation-added source code and compile the annotation-added source code to create the executable program, and transmit the executable program to other information processing apparatus to be executed by the other information processing apparatus. Accordingly, only the executable program may be distributed to a user.

Further, respective constitutional elements of respective units illustrated are not necessarily configured to be physically the same as those illustrated. That is, a specific shape of distribution and integration of the respective units is not limited to a shape illustrated, and all or some of the units may be configured to be functionally and physically distributed and integrated in any unit according to various loads or use situation. For example, in the embodiments described above, the structure analysis unit 131, the scanning unit 132, and the creation unit 133 which execute the annotation shift process; the compilation unit 134 which executes the compilation; and the execution analysis unit 135, the determination unit 136, and the execution unit 137 which execute the program execution process are adapted to operate in the same information processing apparatus 100, but, operations of these units may be distributed into and performed in a plurality of information processing apparatuses.

Further, all or some of various processing functions performed by each device may be executed on a CPU (Central Processing Unit) (or a micro-computer such as MPU (Micro Processing Unit) or MCU (Micro Controller Unit)). Further, all or some of various processing functionalities may also be performed on program interpreted and executed by the CPU (or a micro-computer such as MPU or MCU) or hardware by a wired-logic.

Figure 13:
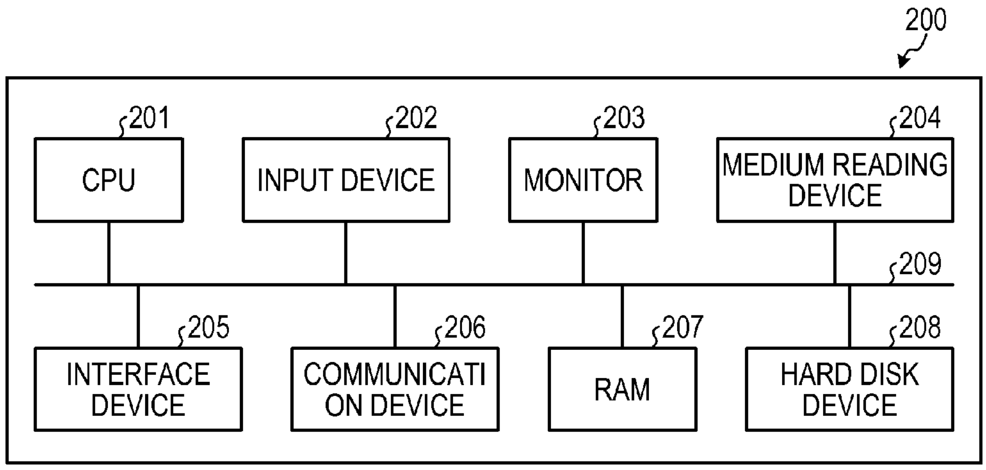
FIG. 13 is a diagram illustrating an example of a configuration of a computer which executes the information processing program, according to an embodiment.

In the meantime, various processing explained in the embodiment may be implemented by executing a program prepared in advance by a computer. Therefore, in the following description, descriptions will be made on an example of the computer which executes the program having the same functionality as that of the embodiment. FIG. 13 is an explanatory diagram illustrating an example of a computer which executes the information processing program.

As illustrated in FIG. 13, the computer 200 includes a CPU 201 which executes various operation processing, an input device 202 which receives a data input, and a monitor 203. Further, the computer 200 includes a medium reading device 204 which reads, for example, a program, from the storage medium, an interface device 205 for being connected with various devices, and a communication device 206 for being connected with, for example, other information processing apparatuses, through wired or wireless connection. Further, the computer 200 includes a RAM 207 which temporarily stores various information, and a hard disk device 208. Further, respective devices 201 to 208 are connected to the bus 209.

In the hard disk device 208, the information processing program having the same functions as respective processing units of the structure analysis unit 131, the scanning unit 132, the creation unit 133, the compilation unit 134, the execution analysis unit 135, the determination unit 136, and the execution unit 137 illustrated in FIG. 2 is stored. Further, the analysis result storage unit 121, the structure storage unit 122, the name space storage unit 123, and the annotation rule storage unit 124 are stored in the hard disk device 208. Further, in the hard disk device 208, the source code storage unit 125, the relationship table storage unit 126, the definition file storage unit 127, the program storage unit 128, and various data for implementing the information processing program are stored. The device 202 has the same function as the input unit 110 illustrated in FIG. 2 and receives inputs of the source code to which shifting to the scheme of making correspondence by the annotation is applied and the definition file corresponding to the source code. The monitor 203 has the same function as the displaying device connected to the output unit 111 illustrated in FIG. 2 and displays, for example, a screen according to the execution result. The interface device 205 is connected with, for example, a printing device. The communication 206 is connected with, for example, other information processing apparatus to exchange various information, such as the annotation-added source code, the definition file, and the executable program, with other information processing apparatuses.

The CPU 201 reads respective programs stored in the hard disk device 208 to develop and execute the programs in the RAM 207, thereby performing various processing. Further, these programs may cause the computer 200 to function as the structure analysis unit 131, the scanning unit 132, the creation unit 133, the compilation unit 134, the execution analysis unit 135, the determination unit 136, and the execution unit 137.

Further, the information processing program described above is not necessarily to be stored in the hard disk device 208. For example, the computer 200 may read and execute a program stored in the storage medium readable by the computer 200. The storage medium readable by the computer 200 corresponds to, for example, a portable recording medium such as a CD-ROM or DVD disk, USB (Universal Serial Bus) memory, a semiconductor memory such as a flash memory, or a hard disk drive. Further, the information processing program may be stored in devices connected to, for example, a public network, the Internet, and the LAN, thereby causing the computer 200 to read and execute the information processing program from the devices.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein an information processing program for causing a computer to perform a process, the process comprising:

performing, for each of interfaces described in a source code of the program being processed, a specifying process of specifying an installed program associated with the each interface, based on a description of the source code including a relevant source code corresponding to the installed program;

storing an identifier of the specified installed program in a memory in association with an interface associated with the installed program;

specifying an interface to be executed upon execution of a program based on the source code, according to contents defined in the source code; and upon execution of the program based on the source code, outputting information on the installed program whose identifier is stored in the memory in association with the specified interface, so that the installed program is identifiable, wherein the specifying process includes:

an analyzing process of analyzing the source code and a definition file associated with the source code, and creating first and second tree-structures, respectively, as an analysis result, a scanning process of scanning the created first and second tree-structures and a name space containing a name of the installed program to obtain a scanning result, a creating process of creating an annotation-added source code in which an annotation is inserted based on the analysis result and the scanning result, the annotation indicating correspondence between the each interface and the installed program; and the installed program is specified based on a description of the annotation-added source code by taking the annotation-added source code as the source code including the relevant source code corresponding to the installed program.

2. The non-transitory, computer-readable recording medium of claim 1, wherein the analyzing process includes creating a third tree-structure as a portion of the first tree-structure which exists in the second tree-structure but does not exist in the first tree-structure.

3. The non-transitory, computer-readable recording medium of claim 1, wherein the creating process includes creating an updated definition file by:

deleting, from the definition file, a definition corresponding to the annotation inserted in the source code, and adding, to the definition file, a search range definition which defines a range to be searched for the installed program.

4. The non-transitory, computer-readable recording medium of claim 3, wherein the scanning process includes scanning the installed program, based on a priority of the search range definition, in a case where the installed program has a plurality of interfaces.

5. A method comprising:

specifying, for each of interfaces described in a source code of a program being processed, an installed program associated with the each interface, based on a description of the source code including a relevant source code corresponding to the installed program;

storing an identifier of the specified installed program in a memory in association with an interface associated with the installed program;

specifying an interface to be executed upon execution of a program based on the source code, according to contents defined in the source code;

upon execution of the program based on the source code, outputting information on the installed program whose identifier is stored in the memory in association with the specified interface, so that the installed program is identifiable;

analyzing the source code and a definition file associated with the source code, and creating first and second tree-structures, respectively, as an analysis result;

scanning the created first and second tree-structures and a name space containing a name of the installed program to obtain a scanning result;

creating an annotation-added source code in which an annotation is inserted based on the analysis result and the scanning result, the annotation indicating correspondence between the each interface and the installed program; and specifying the installed program based on a description of the annotation-added source code by taking the annotation-added source code as the source code including the relevant source code corresponding to the installed program.

6. An apparatus comprising:

a memory; and a processor coupled to the memory, the processor being configured to:

specify, for each of interfaces described in a source code of a program being processed, an installed program associated with the each interface, based on a description of the source code including a relevant source code corresponding to the installed program;

store an identifier of the specified installed program in the memory in association with an interface associated with the installed program;

specify an interface to be executed upon execution of a program based on the source code, according to contents defined in the source code;

upon execution of the program based on the source code, output information on the installed program whose identifier is stored in the memory in association with the specified interface, so that the installed program is identifiable;

analyze the source code and a definition file associated with the source code, and create first and second tree-structures, respectively, as an analysis result;

scan the created first and second tree-structures and a name space containing a name of the installed program to obtain a scanning result;

create an annotation-added source code in which an annotation is inserted based on the analysis result and the scanning result, the annotation indicating correspondence between the each interface and the installed program; and specify the installed program based on a description of the annotation-added source code by taking the annotation-added source code as the source code including the relevant source code corresponding to the installed program.

* * * * *